Nov. 24, 1964     M. KEMENCZKY     3,157,991
FLOW REGULATING DEVICE FOR JET PROPULSION ENGINE
Filed April 16, 1963     4 Sheets-Sheet 1

3,157,991
FLOW REGULATING DEVICE FOR JET
PROPULSION ENGINE
Miklos Kemenczky, Maquoketa, Iowa, assignor to
Kemenczky establishment, Vaduz, Liechtenstein
Filed Apr. 16, 1963, Ser. No. 273,336
5 Claims. (Cl. 60—35.6)

This invention relates to an improved flow regulating device which may be used in jet propulsion engines for watercraft, air-hydropulse pumping devices and similar structures. More particularly, the invention relates to an improved flow regulating device which comprises a series of alternating counter-rotatable turbine wheels, each of which is free wheeling when liquid passes through it in one direction and which is stationary when liquid passes through it in the opposite direction.

The devices to which this invention relate are employed in jet propulsion engines of a type similar to that described in my application Serial No. 40,452, filed July 1, 1960, entitled "Jet Propulsion Engine for Watercraft" which issued as United States Patent 3,060,682 on October 30, 1962. In these engines, the charge, consisting of a mixture of air and an easily combustible fuel, is drawn into a combustion chamber and ignited therein. The rapidly expanding combustion gases then pass through a series of compartments in the combustion chamber, through an impulse orifice, into a thrust tube. The thrust tube has an inlet opening for water forward of the impulse orifice and a discharge opening at the rear of the thrust tube aft of the impulse orifice. The rapidly expanding combustion gases being driven out of the combustion chamber act upon the column of water within the thrust tube, ejecting rearwardly from the tube, thereby producing a jet thrust reaction. This jet thrust can be utilized either to propel the jet motor forward through the liquid medium, such as water, or to pump the liquid, such as oil, water, acid, etc., rearwardly through the thrust tube.

In such devices, a closure valve is preferably placed at the impulse orifice of the combustion chamber leading into the thrust tube. Such a valve serves to separate the gases in the combustion chamber from the liquid in the thrust tube during the part of the cycle immediately preceding ignition of the combustible gases due to the suction produced by the liquid in the thrust tube rushing past the face of the orifice. A closure valve also serves to prevent wetting or quenching of the ignition system. As an alternative to a closure valve, a hydrodynamic grid type vent, such as is described in my copending application Serial No. 273,335, filed on April 16, 1963, may also be employed.

A principal object of the present invention is to provide a flow regulating device located in a conduit which device will offer minimal resistance to the flow of fluid going in one direction and which will offer maximum resistance to the flow of fluid going in the opposite direction.

Another object of the present invention is to provide a flow regulating device located near the intake of a thrust tube which device will offer minimal resistance to the flow of fluid entering the intake of the trust tube and which will offer maximum resistance to the flow of fluid in the direction opposite to this.

Another object of the present invention is to provide two flow regulating devices, one of which is located near the intake of the thrust tube, which will offer minimal resistance to the flow of fluid entering the intake of the thrust tube and which will offer maximum resistance to the flow of fluid in the direction opposite to this, and the second of which is located near the exhaust to the thrust tube, offering minimal resistance to the flow of fluid leaving the exhaust of the thrust tube and offering maximum resistance to the flow of fluid in the direction opposite to this.

Another object of the present invention is to provide a flow regulating device for a jet propulsion engine for watercraft which will control the flow of fluid through the thrust tube of the jet propulsion engine while causing a minimum of turbulence in the thrust tube.

An additional object of the invention is to provide a device which will operate over a wide range of engine speeds, without inducing objectionable vibrations and which also serves as an effective means for disintegrating water plants which might otherwise clog the jet propulsion engine.

A further object of the present invention is to provide a flow regulating device which can be readily and economically manufactured.

Other objects of the invention will in part be obvious and will in part appear hereinafter.

The invention comprises a structure of counter rotating turbine wheels for a thrust tube of a jet propulsion engine and includes a shaft secured to the thrust tube near the inlet opening and a plurality of counter rotating turbine wheels on the shaft. The turbine wheels are adapted to turn freely when fluid, such as water, passing through the thrust tube exerts a pressure on the wheels from the direction of the inlet opening. When the fluid flows in the opposite direction in the thrust tube, as occurs during the combustion period, the wheels are adapted to lock in place in the thrust tube, presenting a labyrinth passageway which inhibits the flow of fluid out of the passageway due to the resistance offered by the fluid turbulence between the locked turbine wheel blades.

The turbine wheels may be adapted to friction lock on the shaft by being located on individual tapered sections of the shaft for each turbine wheel, as in FIG. 4 and FIG. 5. When pressure is exerted on a turbine wheel from the inlet direction the wheel will be shifted on the tapered shaft to the narrower end, where it may rotate freely, and when pressure is exerted on the wheel from the interior of the thrust tube, the wheel will be shifted to the thicker end, where friction between the wheel and the shaft will cause the wheel to slow down and stop.

The turbine wheels may be adapted to lock one upon one another, as in FIG. 2 and FIG. 3. In such a case the turbine wheels are located on shafts of increasing diameter in the direction from the inlet to the outlet and the turbine blades extend beyond the width of the turbine wheel hubs. When pressure is exerted on a turbine wheel from the inlet direction the wheel will be shifted toward the outlet of the thrust tube and will be stopped from contacting the adjacent turbine wheel by the slightly wider shaft on which the adjacent turbine wheel is mounted. When pressure is exerted on the wheel from the interior of the thrust tube, the wheel will be shifted toward the inlet of the tube. Since the individual turbine blades extend beyond the hubs, each turbine wheel locks upon the next adjacent wheel.

The turbine wheels may also be adapted to lock one upon one another, as in FIG. 6 and FIG. 7. In such a case the turbine wheels are located on shafts of increasing diameter in the direction from the inlet to the outlet and adjacent turbine hubs have engageable tapered sections. When pressure is exerted on a turbine wheel from the inlet direction the wheel will be shifted toward the outlet of the thrust tube and will be stopped from contacting the adjacent turbine wheel by the slightly wider shaft on which the adjacent turbine wheel is mounted. When pressure is exerted on the wheel from the interior of the thrust tube, the wheel will be shifted toward the inlet of the tube, thereby engaging adjacent tapered sections and locking the two wheels together due to the frictional forces between the engaged tapered sections.

The counter rotating turbine wheels may be adapted to function in the outlet section of the thrust tube, as well as the inlet section. Here the wheels would be freely rotating to allow the fluid passing through the tube to be ejected from the outlet opening with little or no restriction but would inhibit flow into the tube through the outlet opening by locking and creating a labyrinth passageway impeding the flow of fluid into the tube. The means to lock the wheels would be the same as described above for the wheels in the inlet opening.

The function of the counter rotating blades located in the inlet and outlet are similar in that both would operate to prevent fluid from flowing into the tube from outside. However, the counter rotating wheels in the inlet also act as a strainer to prevent foreign object from entering the inside of the tube and as a disintegrator for any plant life entering the tube.

The invention, accordingly, comprises the features of construction, combination of elements, and an arrangement of parts, which will be exemplified in the constructions hereinafter set forth, and the scope of the invention will be indicated in the claims.

For a fuller understanding of the nature and objects of the invention, reference should be had to the following detailed description taken in connection with the accompanying drawings, in which.

Figure 6:
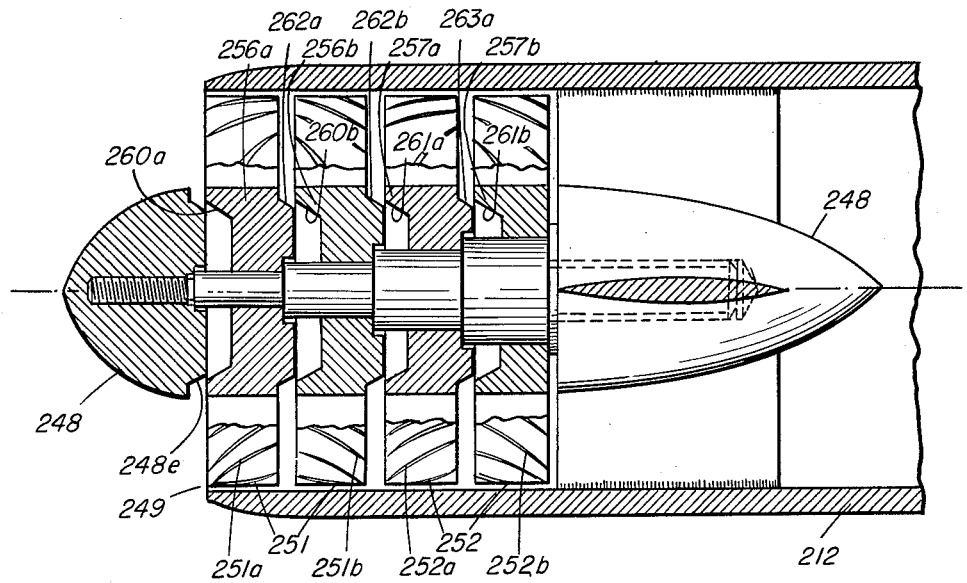
Figure 7:
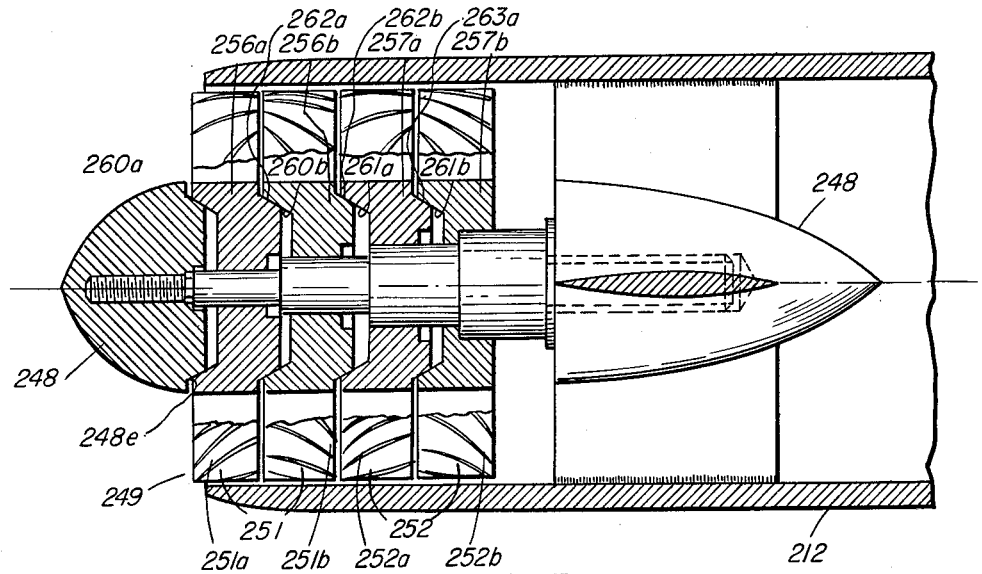

FIG. 6 is an enlarged partial sectional side elevational view of another embodiment of the present invention, illustrating the arrangement of parts when the flow is in the indicated direction; and FIG. 7 is an enlarged partial sectional side elevational view of the embodiment of the present invention shown in FIG. 6, illustrating the arrangement of parts when the flow is in the indicated direction.

FIGS. 2, 3, 4, 5, 6 and 7 show only the forward end of the jet engine 15. In each case, the remainder of the engine may be exactly as shown in FIG. 1.

Figure 1:
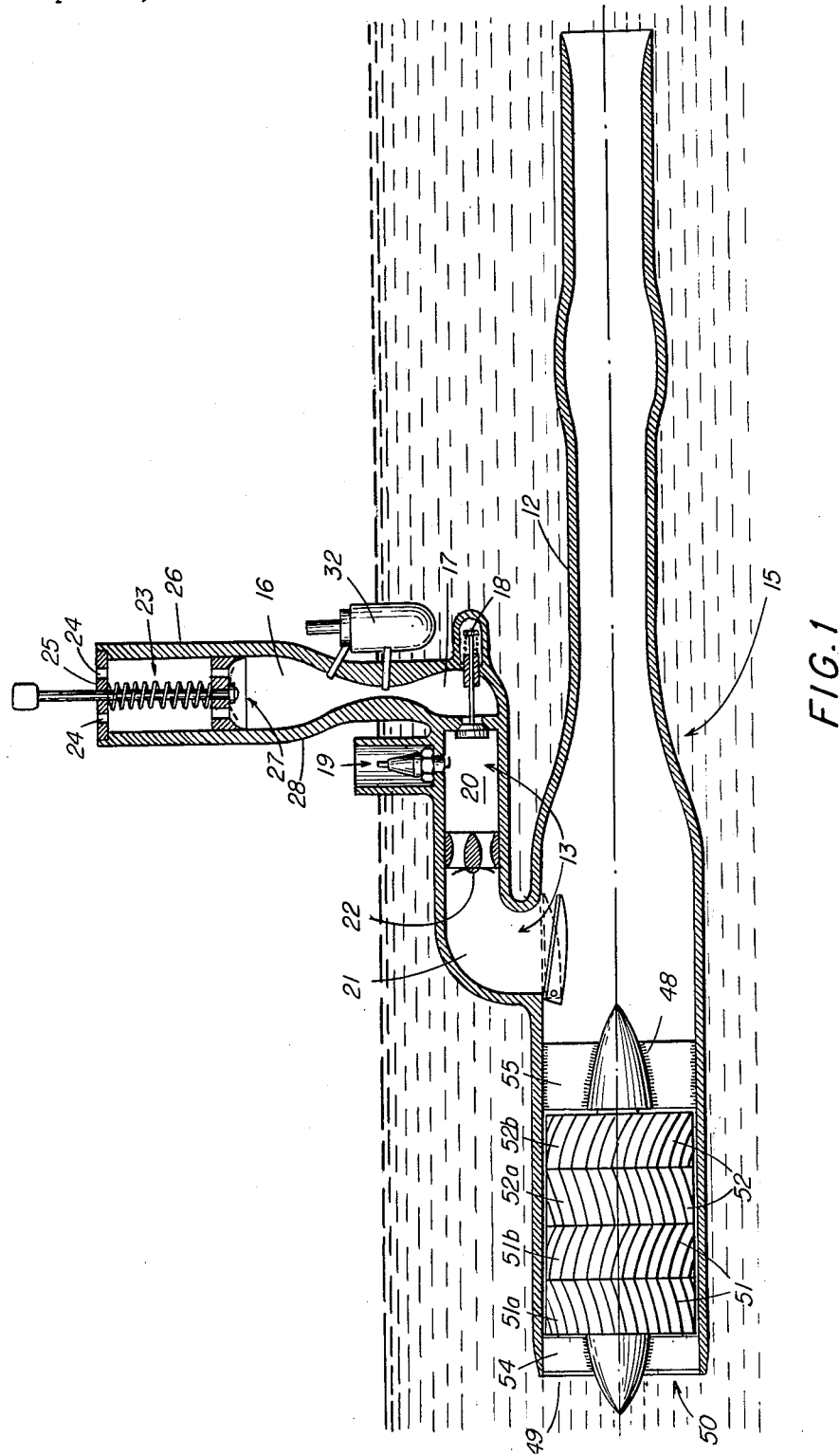
FIG. 1 is a sectional side view illustrating an embodiment of the flow regulating device of a jet propulsion engine for watercraft.
Figure 2:
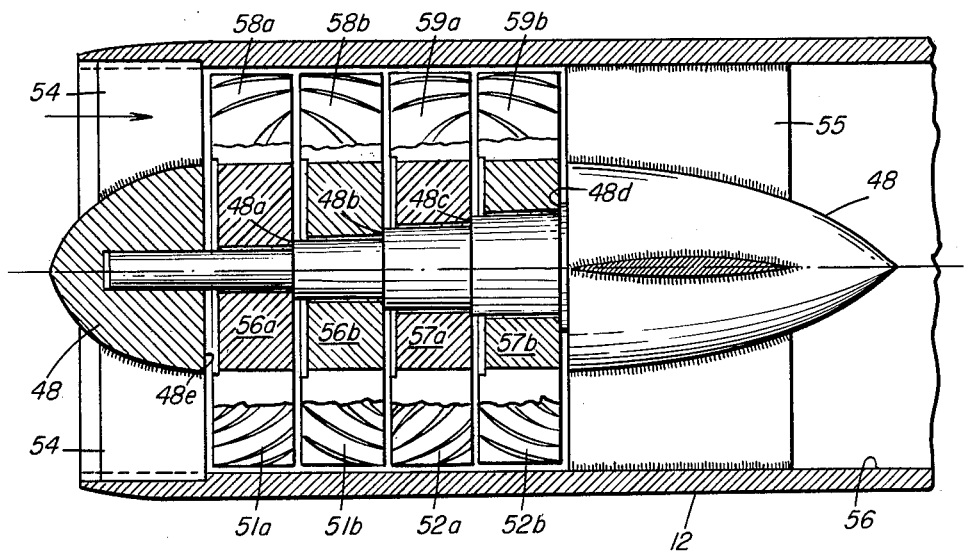
FIG. 2 is an enlarged partial sectional side elevational view of the embodiment of the flow regulating device of the present invention shown in FIG. 1, illustrating the arrangement of parts wherein the flow is in the indicated direction.
Figure 3:
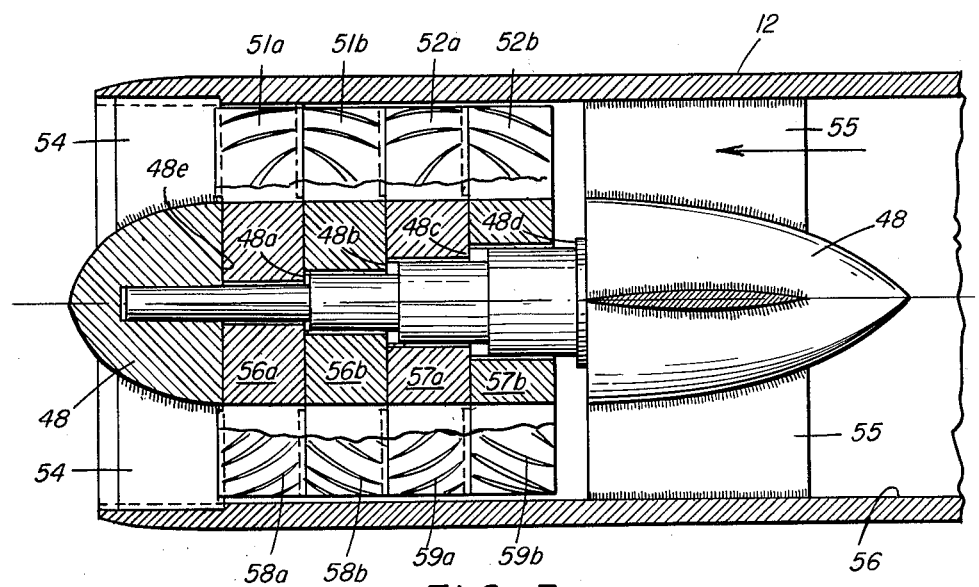
FIG. 3 is an enlarged partial sectional side elevational view of the embodiment of the flow regulating device of the present invention shown in FIG. 1, illustrating the arrangement of parts when the flow is in the indicated direction.

Referring to the drawings in which like numerals identify similar parts throughout, it will be seen, as illustrated in FIGS. 1-3, inclusive, one embodiment of the present invention includes a flow regulating device 50 located in the intake 49 of a thrust tube 12 of a jet engine for watercraft 15. The jet engine 15 is similar to the jet engine for watercraft which is shown and more fully described in United States Patent No. 3,060,682, entitled "Jet Propulsion Engine for Watercraft."

As shown in FIG. 1, the jet engine 15 can have an air intake 16, a carburetor 17, a spring loaded combustion valve 18 through which the fuel mixture is drawn from the carburetor, and ignition means 19 for igniting the fuel mixture in combustion chamber 13. The combustion chamber 13 is preferably divided into at least two compartments, the first compartment 20 and the second compartment 21 which are separated by a one-way valve 22. Combustion air flows to carburetor 17 through an air pump 23 by means of apertures of 24, 24 in the end 25 of an air pump housing 26 and through a piston 27 which, when the engine is in operation, is in stationary position. The housing 26 of this hand operated spring loaded starting air pump 23 forms part of the intake pipe 28 for the combustion air. Gasoline or other fuel can be introduced into carburetor 17 through fuel float means 32.

The flow regulating device 50 of the present invention located at the forward end of thrust tube 12 replaces the rotary check valve which is described in United States Patent No. 3,060,682.

In FIG. 1, flow regulating device 50 is comprised of shaft 48 which is axially mounted in thrust tube 12, turbine wheel pair 51, comprising turbine wheel 51a which rotates in one direction and turbine wheel 51b which rotates in the opposite direction, and turbine wheel pair 52, comprising turbine wheel 52a, which rotates in the opposite direction to turbine wheel 51b and turbine 52b, which rotates in the opposite direction to turbine 52a. Each of said turbine wheels are provided with means such that they are freely rotatable on shaft 48 when fluid is passing through thrust tube 12 from the intake end toward the exhaust end. Each of said turbine wheels is also provided with means whereby its rotation is prevented when fluid is flowing through said thrust tube 12 in a direction from the exhaust end to the intake end. Shaft 48 is secured to thrust tube 12 by means of brackets 54 and 55, which are mounted on the inside 56 of thrust tube 12.

FIGS. 2 and 3 show, in greater detail, the embodiment of the flow regulating device shown in FIG. 1.

When the flow of fluid is in the direction indicated in FIG. 2, the turbine wheels 51a, 51b, 52a and 52b, having hubs 56a, 56b, 57a and 57b, respectively, and blades 58a, 58b, 59a and 59b, respectively, rotate freely about shaft 48. Hubs 56a, 56b, 57a and 57b are limited in their axial travel along shaft 48 by surfaces 48a, 48b, 48c and 48d, respectively, which permit rotation but limit axial movement. Since the turbine wheels, when fluid is flowing in this direction, are free to rotate, the flow of fluid through the thrust tube 12 is not impeded by the turbine wheels. Turbine wheels 51a and 52a rotate in one direction and turbine wheels 51b and 52b rotate in the opposite direction. When the flow of fluid through the thrust tube 12 is in the reverse direction as indicated in FIG. 3, turbine wheel 51a is urged against brackets 54 and locked in place due to the engagement of blades 58a with brackets 54. At the same time that turbine wheel 51a is urged against brackets 54, turbine wheel 51b is urged against turbine wheel 51a, turbine wheel 52a is urged against turbine wheel 51b and turbine wheel 51b is urged against turbine wheel 42a. Turbine blades 58b, 59a, and 59b interlocking, respectively, with turbine blades 58a, 58b and 59a. In this way, all four turbine wheels are held by friction as a unit and the flow of water therethrough is substantially prevented. In this embodiment, the turbine wheel unit is locked in place due to the engagement of blades 58a with brackets 54. However, it is possible to have blade 51 urged against the surface 48e of shaft 48, with the hub 56a so constructed that it extends slightly forward of blades 58a and thereby permits the rotation of turbine wheel 51a against surface 48e, even though urged against this surface by the fluid passing therethrough. By balancing the turbine wheels as to clockwise and counterclockwise torque the entire unit of four turbine wheels do not rotate about shaft 48 when the flow of fluid is in the interlock indicated in FIG. 3, regardless of whether or not turbine 51a is free to rotate against surface 48e or is locked in place by brackets 54 engaging blades 58a. When turbine wheel 51a is free to rotate against surface 48e, a quick transition to rotation is possible when the flow of fluid is reversed. When turbine wheel 51a is adapted to stop its rotation due to engagement with brackets 54 or other engagement of frictional contact with the forward end of shaft 48, the turbine wheels need not be balanced as to clockwise and counterclockwise rotation.

Figure 4:
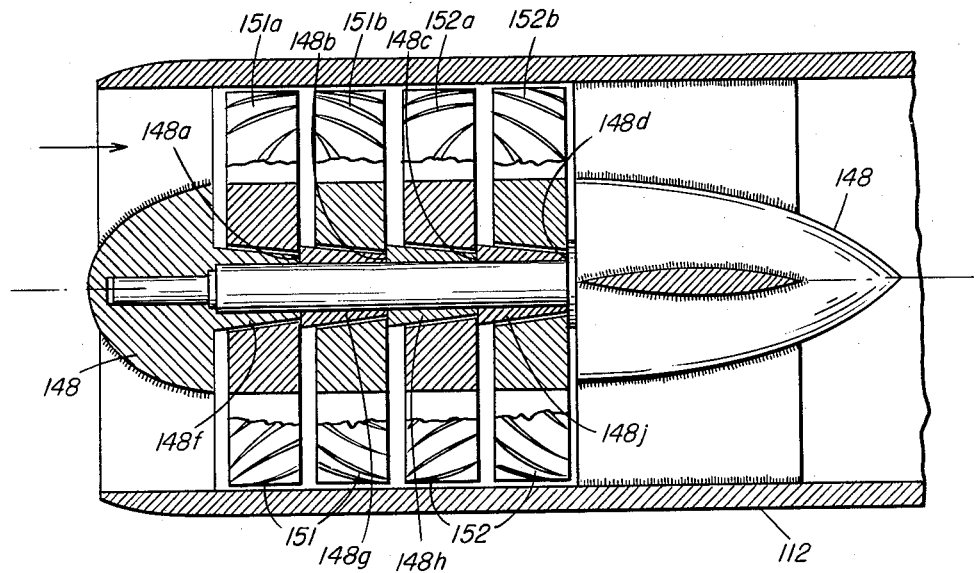
FIG. 4 is an enlarged partial sectional side elevational view of another embodiment of the present invention, illustrating the arrangement of parts when the flow is in the indicated direction.
Figure 5:
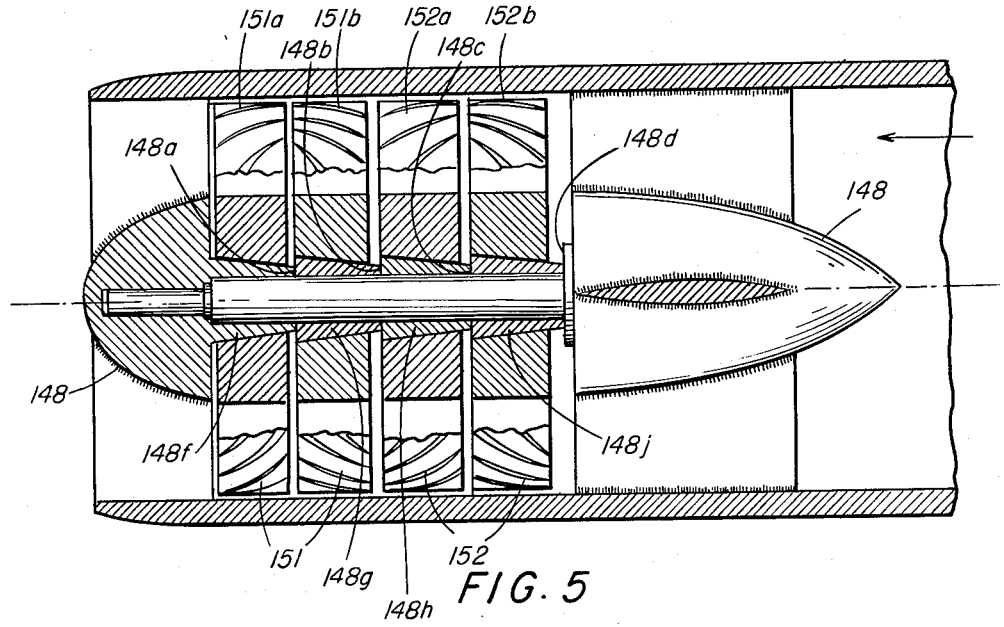
FIG. 5 is an enlarged partial sectional side elevational view of the embodiment of the present invention shown in FIG. 4, illustrating the arrangement of parts when the flow is in the indicated direction.

FIG. 4 and FIG. 5 illustrate a different embodiment of the present invention. In the embodiment shown in FIG. 4 the thrust tube 112 is constructed exactly as thrust tube 12 in FIG. 1. The corresponding parts to FIGS. 1, 2 and 3 are identified by similar numerals in FIG. 4 and FIG. 5, except that 100 has been added to the figure. Referring to FIG. 4, shaft 148 is provided with tapered sections 148f, 148g, 148h and 148j. Turbine wheels 151a, 151b, 152a and 152b are adapted to rotate about portions 148f, 148g, 148h and 148j of shaft 148 and are restricted in their rotation toward the outlet end of shaft 112 by surfaces 148a, 148b, 148c and 148d. Thus, when fluid is flowing in the direction indicated in FIG. 4, the four turbine blades are free to rotate, blades 151a and 152a rotating in one direction and blades 151b and 152b rotating in the opposite direction. When the direction of fluid flow in this embodiment is in the drection shown in FIG. 5, blades 151a, 151b, 152a and 152b are urged toward the inlet 149 of thrust tube 111 and are prevented from rotation due to frictional engagement with tapered surfaces 148f, 148g, 148h and 148j, respectively, of shaft 148. Thus, flow of fluid is restricted due to the same type of labyrinth created in FIG. 3.

FIG. 6 represents still another embodiment of the present invention with the direction of flow as indicated and FIG. 7 represents the same embodiment of the invention in which the direction of flow is opposite to that shown in FIG. 6. In FIGS. 6 and 7, similar parts to those shown in FIGS. 1, 2 and 3 are identified by like numerals, except that 200 has been added to the numerals. In FIG. 6, turbine wheels 251a, 251b, 252a and 252b are provided with hubs 256a, 256b, 257a, 257b, having tapered surfaces 260a, 260b, 261a, 261b and tapered surfaces 262a, 262b and 263a. Shaft 248a has tapered surface 248e at its front end when the direction of fluid flow is as indicated in FIG. 6 or four turbine wheels are free to rotate. When the direction of flow is as in FIG. 7 or four turbine wheels are urged toward the inlet 249 of thrust tube 212 and are prevented from rotation by frictional engagement of tapered surfaces 260a, 260b, 261a and 261b with tapered surfaces 248e, 262a, 262b and 263a, respectively, resulting in the same type labyrinth as shown in FIG. 3 and resulting in the prevention of fluid flow through the interlocked turbine blades.

In the embodiments shown in FIGS. 1–7, it is not essential that the torque resulting from the rotation of the turbine wheels in one direction be the same as the torque resulting from the rotation of the other turbine wheels in the opposite direction, since the rotation of the turbine wheels is prevented by their frictional engagement with either the shaft or the thrust tube housing and not by a frictional engagement with one another. Thus, there is no possible way in which the turbine wheels could rotate as a unit in these embodiments. However, counter-rotating wheels are preferred, since they provide a smoother fluid flow in a direction from the inlet.

Each of the turbine wheels employed in the flow regulating device of the present invention may have blades which are at an angle which permits the free flow of water therethrough. The size of the blades and the angle of the blades in the turbine wheels are preferably the same for the entire series of turbine wheels. However, both the size and the angle of the blades may be varied from blade to blade. But if they differ, the total torque in one direction of rotation should be the same as the total torque in the opposite direction of rotation, in those embodiments where the blades are adapted to lock only on each other, so that when all of the blades are locked together by means of fluid pressure, there is no residual torque from any one blade. While the blades are preferably employed in counter rotating pairs, it is possible to employ an uneven number of turbine wheels, so long as the blade size, shape and angle in each of the blades are adjusted to balance the total torque in each direction when there is no provision for locking the entire blade unit in the thrust tube. While a minimum of two counter-rotating wheels is required with the present invention, the maximum number of wheels may be employed is limited only by the amount of pressure existing in the thrust tube. However, it is most convenient to employ two or three pairs of wheels to accomplish the purpose of the present invention.

The counter-rotating wheels employed in the flow regulating device of the present invention readily permit the flow of fluid in one direction. However, when fluid pressure is exerted on the wheels in the opposite direction the rotation of the wheels is stopped, by any one of the means more fully set forth in the specification. Once the rotation of the wheels has stopped, the entire series of wheels serves as an effective barrier or labyrinth against the flow of fluid therethrough.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. A jet propulsion engine for use on watercraft or as a fluid pump, comprising a thrust tube having a fluid inlet opening and a discharge opening, a combustion chamber with means for supplying a combustible mixture of fuel and air to said combustion chamber, an ignition means for igniting said fuel mixture in said combustion chamber, a discharge means for connecting said thrust tube with said combustion chamber so that the combustion gases from said combustion chamber may pass through said discharge means into said thrust tube to eject water from said thrust tube through said discharge opening and a flow regulating device comprising a plurality of turbine wheels in said thrust tube positioned on a common shaft, said flow regulating device permitting free flow of fluid into said thrust tube through one of said openings and having means for locking the turbine wheels in a stationary position, whereby the flow of fluid is inhibited, when the flow of fluid is in the opposite direction.

2. A jet propulsion engine for use on watercraft or as a fluid pump, comprising a thrust tube having a fluid inlet opening and a discharge opening, a combustion chamber with means for supplying a combustible mixture of fuel and air to said combustion chamber, an ignition means for igniting said fuel mixture in said combustion chamber, a discharge means for connecting said thrust tube with said combustion chamber so that the combustion gases from said combustion chamber may pass through said discharge means into said thrust tube to eject water from said thrust tube through said discharge opening and a flow regulating device comprising a plurality of counter-rotating turbine wheels in said thrust tube positioned on a common shaft, said flow regulating device permitting free flow of fluid into said thrust tube through one of said openings and having means for locking the turbine wheels in a stationary position, whereby the flow of fluid is inhibited, when the flow of fluid is in the opposite direction.

3. A jet propulsion engine as in claim 1 wherein the means for locking the turbine wheels comprises a tapered section on the shaft which engages the inner rim of said wheels when said wheels are urged in one axial direction and which permits said wheels to rotate when they are urged in the opposite axial direction.

4. A jet propulsion engine as in claim 1 wherein the means for locking the turbine wheels comprises a plurality of tapered sections on the outer edge of the hubs of the turbine wheels which tapered sections are adapted to engage a plurality of tapered sections on the inner edge of adjacent turbine wheels when the wheels are urged in one axial direction, whereby the wheels are permitted to rotate when they are urged in the opposite axial direction.

5. A jet propulsion engine as in claim 1 wherein the means for locking the turbine wheels comprises means for limiting the axial movement of the turbine wheels in either direction and turbine wheels having blades which extend beyond the hubs on one side and not the other side, so that when the wheels are urged in one axial direction the blades of one wheel engage the blades of the next adjacent wheel and when the wheels are urged in the opposite axial direction the blades do not engage.

References Cited by the Examiner
UNITED STATES PATENTS

| 1,760,480 | 5/30 | Coats | 60—54 |
| 2,611,532 | 9/52 | Ljungstrom | 253—16.5 X |
| 3,060,682 | 10/62 | Kemenczky | 60—35.6 |

SAMUEL LEVINE, *Primary Examiner*.